US010824248B2

(12) United States Patent
Liu

(10) Patent No.: US 10,824,248 B2
(45) Date of Patent: Nov. 3, 2020

(54) COMPUTER MOUSE

(71) Applicant: Chicony Electronics Co., Ltd., New Taipei (TW)

(72) Inventor: Chin-Sheng Liu, New Taipei (TW)

(73) Assignee: Chicony Electronics Co., Ltd., Taipei (TW)

( * ) Notice: Subject to any disclaimer, the term of this patent is extended or adjusted under 35 U.S.C. 154(b) by 0 days.

(21) Appl. No.: 16/357,303

(22) Filed: Mar. 18, 2019

(65) Prior Publication Data

US 2020/0167011 A1 May 28, 2020

(30) Foreign Application Priority Data

Nov. 27, 2018 (TW) ............................ 107142300 A

(51) Int. Cl.
*G06F 3/0354* (2013.01)
*G06F 3/02* (2006.01)

(52) U.S. Cl.
CPC ........ *G06F 3/03543* (2013.01); *G06F 3/0202* (2013.01)

(58) Field of Classification Search
CPC ........................... G06F 3/03543; G06F 3/0202
See application file for complete search history.

(56) References Cited

U.S. PATENT DOCUMENTS

2010/0245249 A1* 9/2010 Ng ...................... G06F 3/03543 345/166
2010/0274932 A1* 10/2010 Kose ..................... G06F 3/0383 710/19
2015/0193023 A1* 7/2015 Odgers .................. G06F 3/017 345/163
2017/0045959 A1* 2/2017 Chen .................. G06F 3/03543
2017/0249025 A1* 8/2017 Roland .............. G06F 3/03548

FOREIGN PATENT DOCUMENTS

TW 201113761 A 4/2011

* cited by examiner

*Primary Examiner* — Andrew Sasinowski
(74) *Attorney, Agent, or Firm* — CKC & Partners Co., LLC

(57) ABSTRACT

A mouse includes a housing, a button, and a slider. The button is pivotally connected to the housing. The button includes a first abutting portion. The slider is slidably engaged with the housing. The slider includes a second abutting portion. When the slider is located at a first position relative to the housing, the first abutting portion abuts against the second abutting portion. When the slider is located at a second position relative to the housing, the first abutting portion is separated from the second abutting portion.

11 Claims, 9 Drawing Sheets

100
120
121
120
114
110
130
114
172
170
172
130
Z
X
Y 100
122
120
110
112
1242a
150
126
124
1242
1244
1244a
132
132b
132a
170
172
130
160
114
116
140
Z
X

COMPUTER MOUSE

CROSS-REFERENCE TO RELATED APPLICATION

This application claims priority to Taiwan Application Serial Number 107142300, filed Nov. 27, 2018, which is herein incorporated by reference in its entirety.

BACKGROUND

Field of Invention

The present invention relates to a mouse. More particularly, the present invention relates to the mouse of which the resilience of a button is adjustable.

Description of Related Art

Due to the convenience of computer devices, people rely upon the computer devices for production or leisure activities nowadays. When an user uses the computer, a mouse is an indispensable control device or an input device. Whether the user is working, playing games or shopping online, a mouse is required to complete the above activities.

In the structure of the mouse, a button is one of the frequently operated components. Through the button of the mouse, the user can click on the interface of the computer. However, each user has different adaptability to the operating feel of different mice. For office workers and e-sport gamers who need to use the computer for a long time, the feel of pressing the button is a crucial reason for users to decide whether to choose the mouse.

Accordingly, how to provide a mouse which is adaptable to user's operating habit becomes an important issue to be solved by those in the industry.

SUMMARY

The invention provides a mouse of which the resilience of a button is adjustable.

According to an embodiment of the present disclosure, the mouse includes a housing, a button, and a slider. The button is pivotally connected to the housing. The button includes a first abutting portion. The slider is slidably engaged with the housing. The slider includes a second abutting portion. When the slider is located at a first position relative to the housing, the first abutting portion abuts against the second abutting portion. When the slider is located at a second position relative to the housing, the first abutting portion is separated from the second abutting portion.

In an embodiment of the disclosure, the housing includes a first opening and a second opening. The button and the slider cover the first opening and the second opening respectively.

In an embodiment of the disclosure, the first opening and the second opening are disposed at opposite sides of the housing respectively.

In an embodiment of the disclosure, the button includes a pressing portion and a lever portion. The pressing portion covers the first opening. The lever portion is connected to the pressing portion. The lever portion includes the first abutting portion.

In an embodiment of the disclosure, the lever portion and the pressing portion form a unitary structure.

In an embodiment of the disclosure, the mouse further includes a limiting member. The limiting member has a through hole extending along a sliding direction of the slider. The slider partially passes through the through hole.

In an embodiment of the disclosure, the slider is configured to slide along a sliding direction relative to the housing. The first abutting portion is a first abutting surface. The second abutting portion is a second abutting surface. The first abutting surface and the second abutting surface are inclined with respect to the sliding direction. When the slider is located at the first position relative to the housing, the first abutting surface abuts against the second abutting surface.

In an embodiment of the disclosure, when the slider is located at a third position relative to the housing. The first abutting surface abuts against the second abutting surface. The third position is a position between the first position and the second position.

In an embodiment of the disclosure, the first abutting portion includes a groove. The second abutting portion is a hook. When the slider is located at the first position relative to the housing, the hook is engaged with the groove of the first abutting portion.

In an embodiment of the disclosure, the second abutting portion is a sleeve. When the slider is located at the first position relative to the housing, the slider is sleeved on an outer edge of the first abutting portion.

In an embodiment of the disclosure, the mouse further includes an elastomer. The housing includes a loading stage. The elastomer is located between and abuts against the loading stage and the button.

Accordingly, in the mouse of the present disclosure, the slider is provided to slide relative to the housing of the mouse to make the slider abut against or be separated from the button. As such, the limiting effect of the resilience of button is achieved. In this way, the user can adjust the resilience of the button according to user's own habit to achieve better pressing feel.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
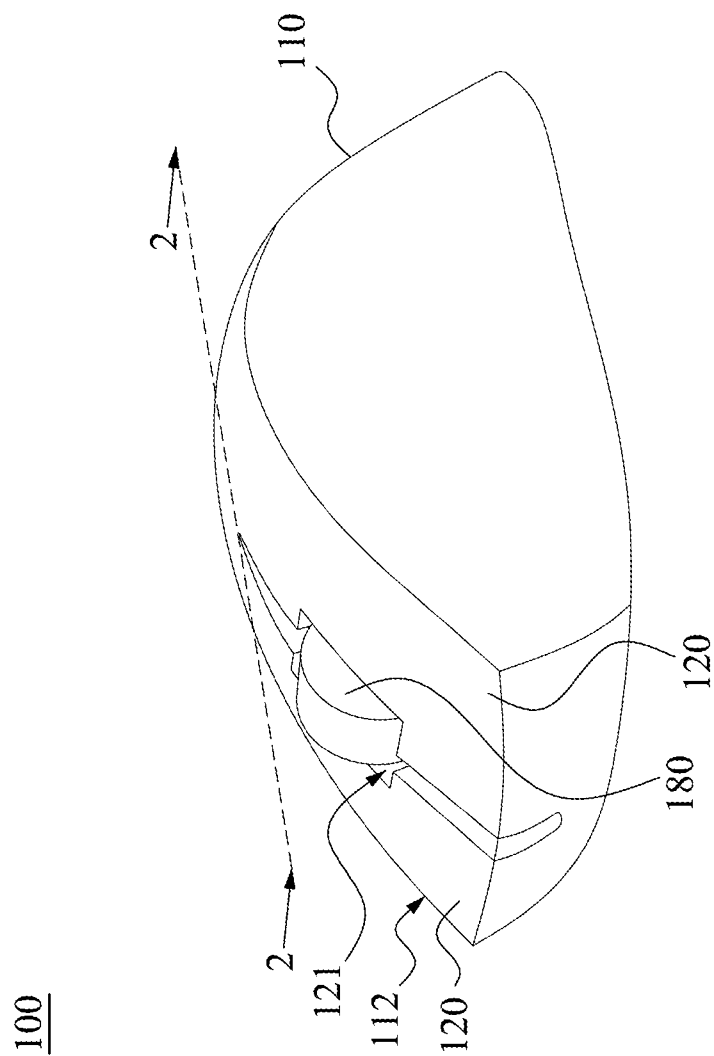
FIG. 1 is a perspective view of a mouse according to an embodiment of the disclosure.

Reference will now be made in detail to the present embodiments of the invention, examples of which are illustrated in the accompanying drawings. Wherever possible, the same reference numbers are used in the drawings and the description to refer to the same or like parts.

Reference is made to FIG. 1. FIG. 1 is a perspective view of a mouse 100 according to an embodiment of the disclosure. As shown in FIG. 1, the mouse 100 includes a housing 110, two buttons 120, and a wheel 180. The housing 110 includes a first opening 112. The buttons 120 are configured as a left button 120 and a right button 120. The left button 120 and the right button 120 cover the first opening 112 and form an accommodating space with the housing 110. A hole 121 is formed between the left button 120 and the right button 120. The wheel 180 is disposed in the housing 110 and is exposed by the hole 121. In the embodiment, the mouse 100 can be a mouse connected to a personal computer or a notebook. In some embodiments, the mouse 100 can be a wireless mouse wirelessly connected to the computer device, the disclosure should not be limited in this regard.

Figure 2A:
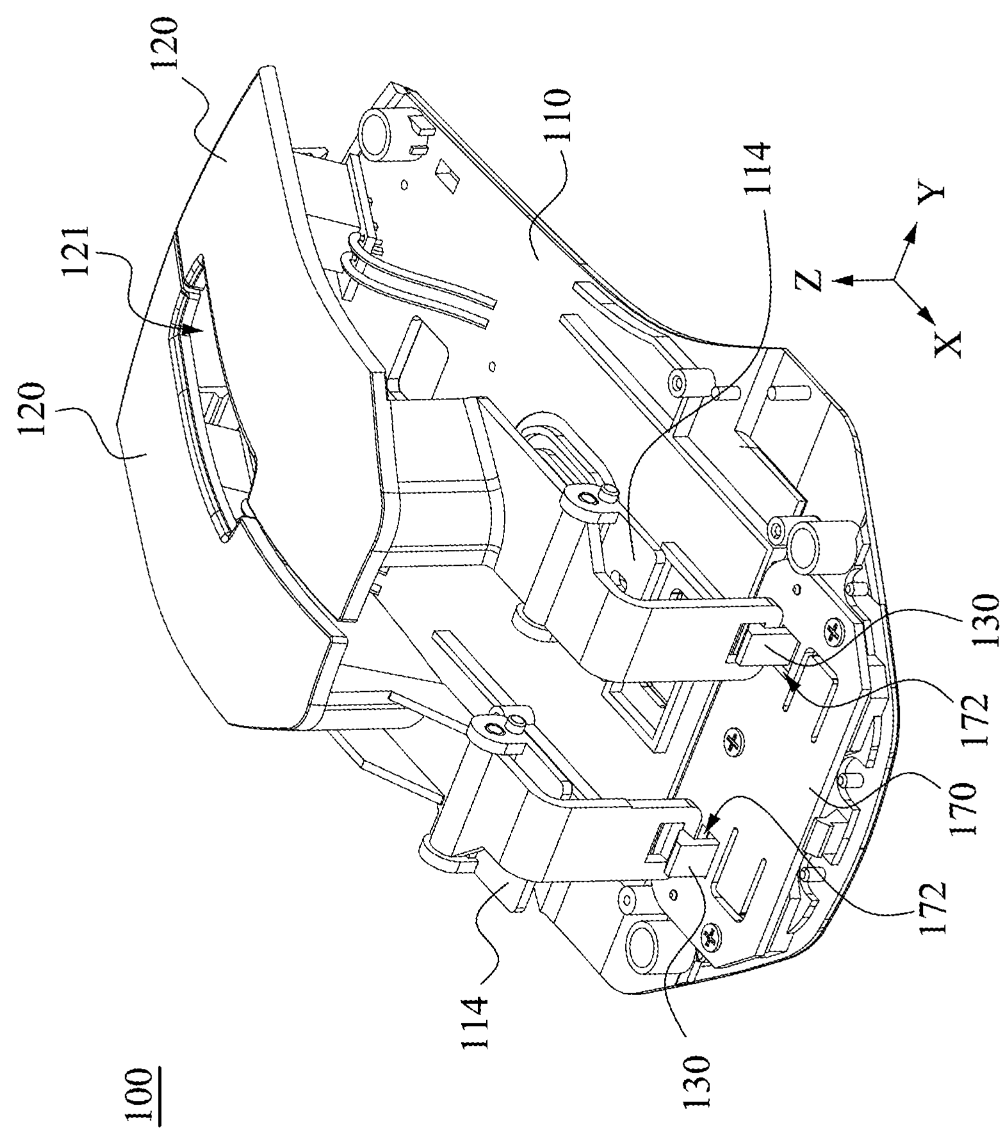
FIG. 2A is a perspective view of partial elements of the mouse in FIG. 1.

Reference is made to FIG. 2A. FIG. 2A is a perspective view of partial elements of the mouse 100 in FIG. 1. As shown in FIG. 2A, in the embodiment, the mouse 100 further includes a slider 130 and a limiting member 170. The limiting member 170 is disposed in the accommodating space formed by the housing 110 and the buttons 120. In the embodiment, a number of the slider 130 is two. The limiting member 170 has two through holes 172 corresponding to the two sliders 130. The two through holes 172 extend along a direction X. The two sliders 130 partially pass through the corresponding through holes 172 of the limiting member 170 respectively. The two sliders 130 are configured to be moved by user's fingers, such that the two sliders 130 abut against the corresponding two buttons 120 of the mouse 100 respectively. The sliders 130 is limited to slide along the direction X in the corresponding through holes 172 to be located at either of a first position or a second position relative to the housing 110. With the restriction of the limiting member 170, the sliders 130 can be accurately moved to the first position or the second position relative to the housing 110 without disengaging from the housing 110. A number of the sliders 130 and the limiting member 170 should not be limited in this regard. As long as the limiting member 170 is able to restrict the slider 130 to move in one direction, other embodiments are possible. In the embodiment, the user can obtain different pressing feels by adjusting the position of the sliders 130 located at a left side and a right side of the mouse 100 respectively when the user presses the left button 120 and the right button 120. The relationship between the location of the slider 130 and the pressing feels of the buttons 120 will be further described in detail below.

Figure 2B:
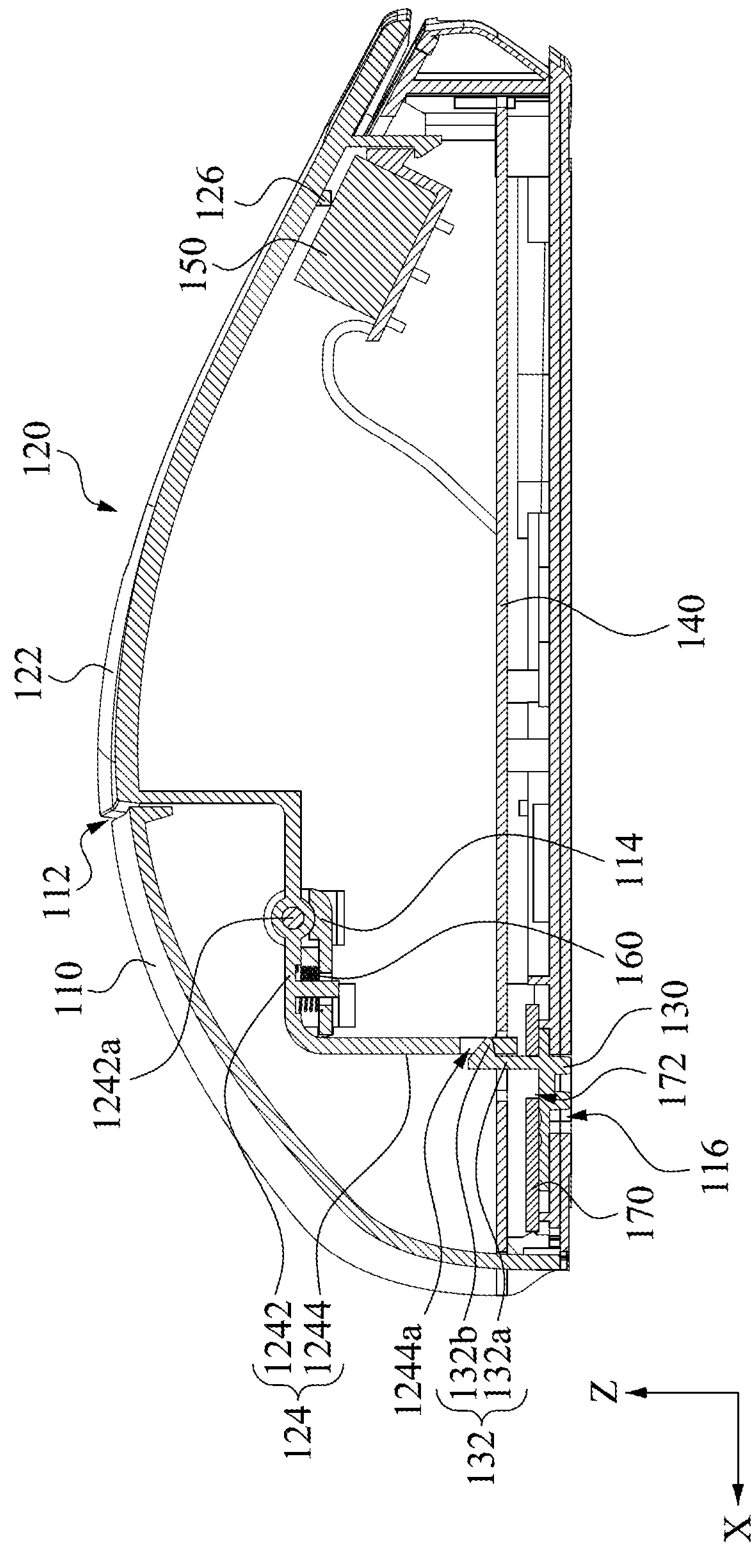
FIG. 2B is a cross-section view of the mouse taken along line 2-2 in FIG. 1, wherein a slider is located at a first position.

Reference is made to FIG. 2B. FIG. 2B is a cross-section view of the mouse 100 taken along line 2-2 in FIG. 1, wherein the slider 130 is located at the first position. As shown in FIG. 2B, the mouse 100 further includes a circuit board 140, a switch 150, and an elastomer 160. The circuit board 140 and the switch 150 are disposed in the accommodating space formed by the housing 110 and the buttons 120. The circuit board 140 is electrically connected to the switch 150. Preferably, the circuit board 140 is electrically connected to the switch 150 through a cable. Each of the buttons 120 further includes a pressing portion 122, a lever portion 124, and an extending portion 126. The pressing portion 122 covers the first opening 112 of the housing 110. The lever portion 124 includes a connecting portion 1242 and a first abutting portion 1244. The connecting portion 1242 is connected between the pressing portion 122 and the first abutting portion 1244, and the connecting portion 1242 is pivotally connected to the housing 110. The connecting portion 1242, the first abutting portion 1244, and the pressing portion 122 form a unitary structure. In the embodiment, there is a rotating shaft 1242*a* disposed on the connecting portion 1242. The housing 110 includes a loading stage 114. The loading stage 114 is disposed under the connecting portion 1242, and the loading stage 114 extends to two ends of the rotating shaft 1242*a* to form a U-shaped structure (as shown in FIG. 2A). Preferably, two ends of the rotating shaft 1242*a* are rotatably engaged with the loading stage 114. As such, the buttons 120 are able to rotate relative to the housing 110. The elastomer 160 is located between and abuts against the loading stage 114 and the connecting portion 1242 to stabilize the rotation of each button 120. On the other hand, the first abutting portion 1244 is bent relative to the connecting portion 1242 and extends away from the pressing portion 122. An end of the first abutting portion 1244 away from the pressing portion 122 has a groove 1244*a*. The extending portion 126 of each button 120 is connected to the pressing portion 122 and abuts against the switch 150.

In the embodiment, the groove 1244*a* is a form of a perforation. In some embodiments, the groove 1244*a* is a form of a notch, but the disclosure should not be limited in this regard.

Figure 2C:
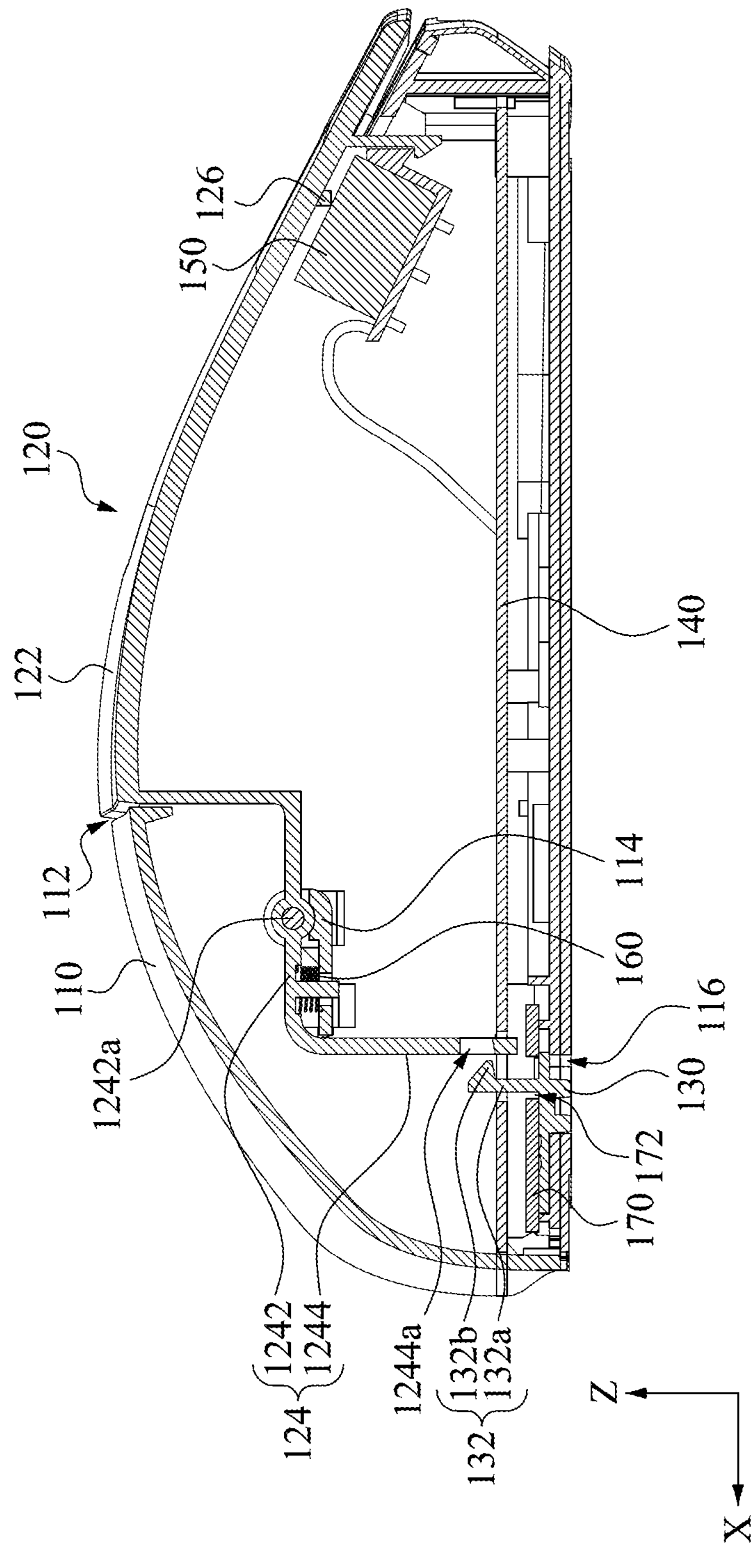
FIG. 2C is another cross-section view of the mouse taken along line 2-2 in FIG. 1, wherein the slider is located at a second position.

In some embodiments, as shown in FIGS. 2B and 2C, when the user presses the pressing portion 122, the extending portion 126 touches the switch 150 to cause the switch 150 to generate a pressing signal. When the user releases the pressing portion 122, the extending portion 126 pushes the pressing portion 122 back to an original position by a repulsive force of the switch 150. Specifically, when the user presses either of the left button 120 or the right button 120 with the finger, the pressed button 120 rotates along a direction of the user's biasing force with the rotating shaft 1242*a* as an axis. As such, the extending portion 126 presses the switch 150. When the user's finger releases the left button 120 or the right button 120, the switch 150 applies the repulsive force to the released button 120, such that the released button 120 rotates in the opposite direction of the user's biasing force, and the released button 120 rotates with the rotating shaft 1242*a* as the axis to push the pressing portion 122 back to the original position. While the pressing portion 122 is pushed back to the original position, the elastomer 160 is pressed by the connecting portion 1242 to store elastic potential energy. The stored elastic potential energy can lead the buttons 120 to constantly abut against the switch 150 when the buttons 120 are not pressed by the user. In other words, the button 120 can be prevented from arbitrarily rotating relative to the housing 110 by the interaction of the switch 150 and the elastomer 160. Therefore, the user would not feel the looseness of the buttons 120 relative to the housing 110.

In some embodiments, the elastomer 160 can be a spring or shrapnel. The disclosure should not be limited in this regard.

In some embodiments, the positions of the loading stage 114 and the elastomer 160 can be adjusted according to actual needs. The disclosure should not be limited in this regard.

Reference is made to FIG. 2B. The housing 110 further includes a second opening 116. The first opening 112 and the second opening 116 are disposed at opposite sides of the housing 110 respectively. The slider 130 is slidably engaged with the housing 110 and covers the second opening 116. The slider 130 includes a second abutting portion 132. In the embodiment, the second abutting portion 132 is constituted by a first extending portion 132*a* and a second extending portion 132*b*. The second extending portion 132*b* is connected to the first extending portion 132*a*. The second extending portion 132*b* extends out from the first extending portion 132*a* to form a hook structure. When the slider 130 is located at the first position relative to the housing 110 (as shown in FIG. 2B), the second extending portion 132*b* of the second abutting portion 132 is engaged with the groove 1244*a* of the first abutting portion 1244 to buckle with the groove 1244*a*. With the above configuration, the rotation of the button 120 is restricted by the engagement of the slider 130. Therefore, the button 120 cannot freely rotate. At this time, the user must apply more force to click on the pressing portion 122, and the pressing feel of the user is conspicuous.

In some embodiments, there is no groove 1244*a* at the end of the first abutting portion 1244 away from the pressing portion 122, and the second abutting portion 132 is not a hook structure. In other words, the first abutting portion 1244 and the second abutting portion 132 are surfaces respectively. When the slider 130 is located at the first position, the surface of the first abutting portion 1244 abuts against the surface of the second abutting portion 132. In this way, the restriction of the rotation of the button 120 can be achieved also.

Reference is made to FIG. 2C. FIG. 2C is another cross-section view of the mouse 100 taken along line 2-2 in FIG. 1, wherein the slider 130 is located at the second position. As shown in FIG. 2C, the slider 130 slides along a direction X relative to the housing 110. When the slider 130 is located at the second position relative to the housing 110, the second abutting portion 132 is separated from the groove 1244*a* of the first abutting portion 1244. At this time, the rotation of the button 120 is not restricted by the slider 130, and thus the button 120 can freely rotate. The user can click on the pressing portion 122 to trigger the switch 150 without applying too much force.

With the above configuration, the user can separately adjust the sliders 130 on the left side and the right side of the housing 110 respectively to adjust the pressing strengths and the pressing feels on the left button 120 and the right button 120 of the mouse 100 according to the user's own habits.

In some embodiments, the number of the slider 130 in FIG. 2A may be configured to be one. In such embodiments, the first abutting portion 1244 of the left button 120 and the first abutting portion 1244 of the right button 120 are engaged to each other. The slider 130 is slidably engaged with the housing 110 to abut against or be separated from the engaged portion of the two first abutting portions 1244. As such, the resilience of the left button 120 and the right button 120 can be simultaneously adjusted by the single slider 130, so that the user have the same pressing feel to the left button 120 and the right button 120. In some embodiments, the number of the slider 130 should not be limited in this regard.

Figure 3B:
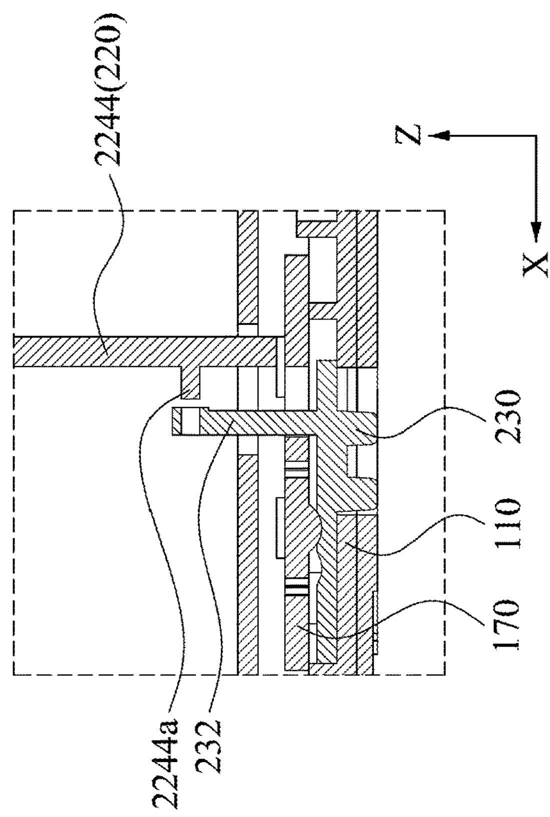
FIG. 3B is a partial cross-section view of the mouse in FIG. 3A, wherein the slider is located at a second position.
Figure 3A:
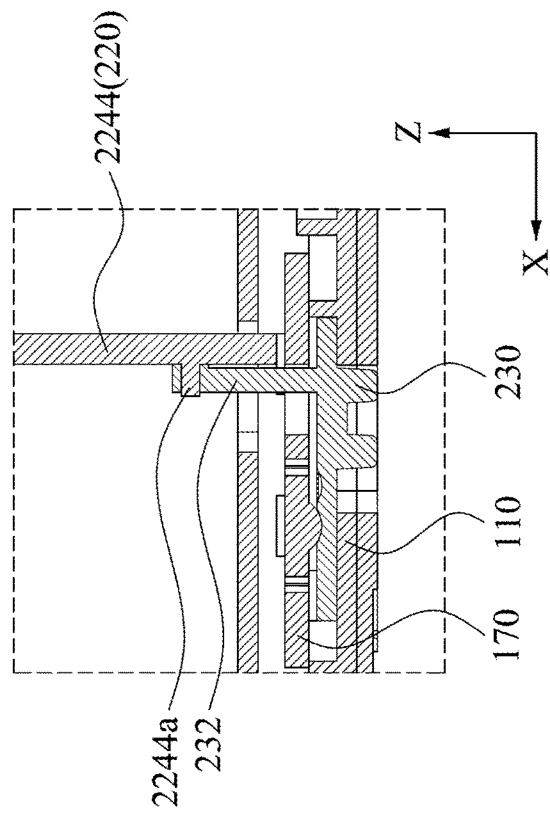
FIG. 3A is a partial cross-section view of a mouse according to another embodiment of the disclosure, wherein a slider is located at a first position.

Reference is made to FIGS. 3A and 3B. FIG. 3A is a partial cross-section view of a mouse 200 according to another embodiment of the disclosure, wherein a slider 230 is located at a first position. FIG. 3B is a partial cross-section view of the mouse 200 in FIG. 3A, wherein the slider 230 is located at a second position. As shown in FIGS. 3A and 3B, in the embodiment, the mouse 200 includes the housing 110, two buttons 220, the circuit board 140, the switch 150, the elastomer 160, the limiting member 170, and the two sliders 230. Each of the buttons 220 includes the pressing portion 122, the connecting portion 1242, a first abutting portion 2244, and the extending portion 126. The connecting portion 1242 includes the rotating shaft 1242*a*. The housing 110, the pressing portion 122, the connecting portion 1242, the rotating shaft 1242*a*, the extending portion 126, the circuit board 140, the switch 150, the elastomer 160, and the limiting member 170 are similar to those of the embodiment of FIG. 2B, and thus are not described again herein. Compared with the embodiment of FIG. 2B, the way of the engagement between each button 220 and the corresponding slider 230 is different in the embodiment. Specifically, in the embodiment, each slider 230 includes a second abutting portion 232. The second abutting portion 232 is a sleeve. The end of the first abutting portion 2244 away from the pressing portion 122 (as shown in FIG. 2B) has a column structure 2244*a*. The column structure 2244*a* extends parallel to the direction X in which the slider 230 slides relative to the housing 110. When the slider 230 is located at the first position relative to the housing as shown in FIG. 3A, the second abutting portion 232 of the slider 230 is sleeved on an outer edge of the column structure 2244*a* to restrict the rotation of the button 220. When the slider 230 is located at the second position relative to the housing 110 as shown in FIG. 3B, the second abutting portion 232 is separated from the column structure 2244*a* of the first abutting portion 2244. In this way, the button 220 is able to freely rotate.

Figure 4A:
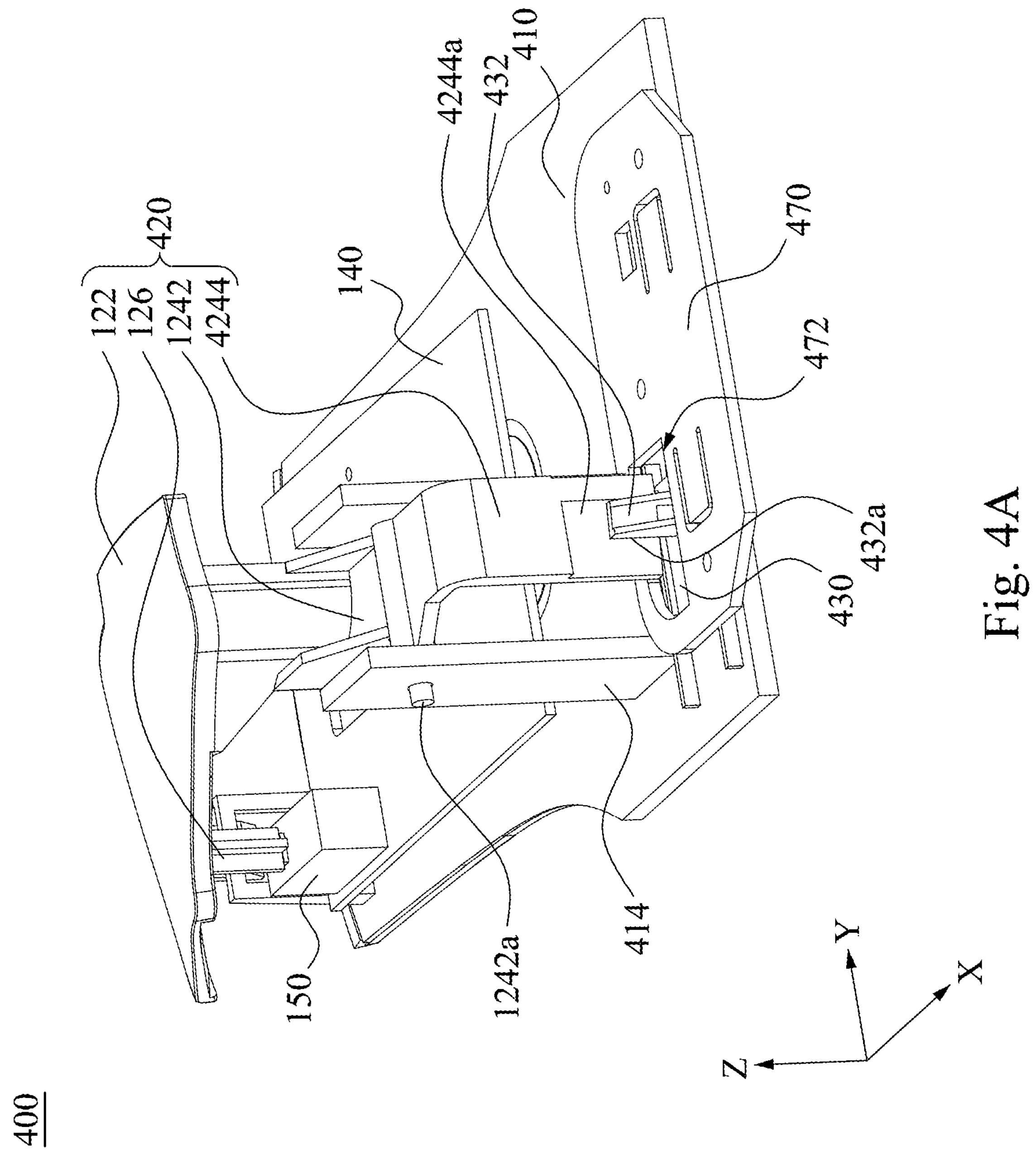
FIG. 4A is a perspective view of partial elements of a mouse according to the other embodiment of the disclosure, wherein a slider is located at a first position.

Reference is made to FIG. 4A. FIG. 4A is a perspective view of partial elements of a mouse 400 according to the other embodiment of the disclosure, wherein a slider 430 is located at a first position. To clearly illustrate the position of the slider 430, only one button 420, the left button 420 for example, is exemplarily shown in FIG. 4A, but the disclosure should not be limited in this regard. As shown in FIG. 4A, in the embodiment, the mouse 400 includes a housing 410, a button 420, the circuit board 140, the switch 150, a limiting member 470, and the slider 430. The button 420 includes the pressing portion 122, the connecting portion 1242, a first abutting portion 4244, and the extending portion 126. The connecting portion 1242 includes the rotating shaft 1242*a*. The pressing portion 122, the connecting portion 1242, the extending portion 126, the rotating shaft 1242*a*, the circuit board 140, and the switch 150 are similar to those of the embodiment of FIG. 2B, and thus are not described again herein. Compared with the embodiment of FIG. 2B, an end of the first abutting portion 4244 away from the pressing portion 122 is a first abutting surface 4244*a*. A second abutting portion 432 of the slider 430 is a second abutting surface 432*a*. The slider 430 is configured to slide along a direction Y relative to the housing 410. Correspondingly, a through hole 472 of the limiting member 470 extends along the direction Y. In the embodiment, the direction Y is perpendicular to the direction X shown in FIG. 2A, but the disclosure should not be limited in this regard. Moreover, the first abutting surface 4244*a* and the second abutting surface 432*a* are inclined with respect to the direction Y. The first abutting surface 4244*a* and the second abutting surface 432*a* have the same slope. In some embodiments, the first abutting surface 4244*a* and the second abutting surface 432*a* may be inclined with respect to the other directions or angles, but the disclosure should not be limited in this regard. When the slider 430 is located at the first position relative to the housing 410, the first abutting surface 4244*a* abuts against the second abutting surface 432*a*. As such, the rotation of the button 420 is restricted by the second abutting portion 432. Therefore, the user needs to apply much force to click the pressing portion 122.

Figure 4B:
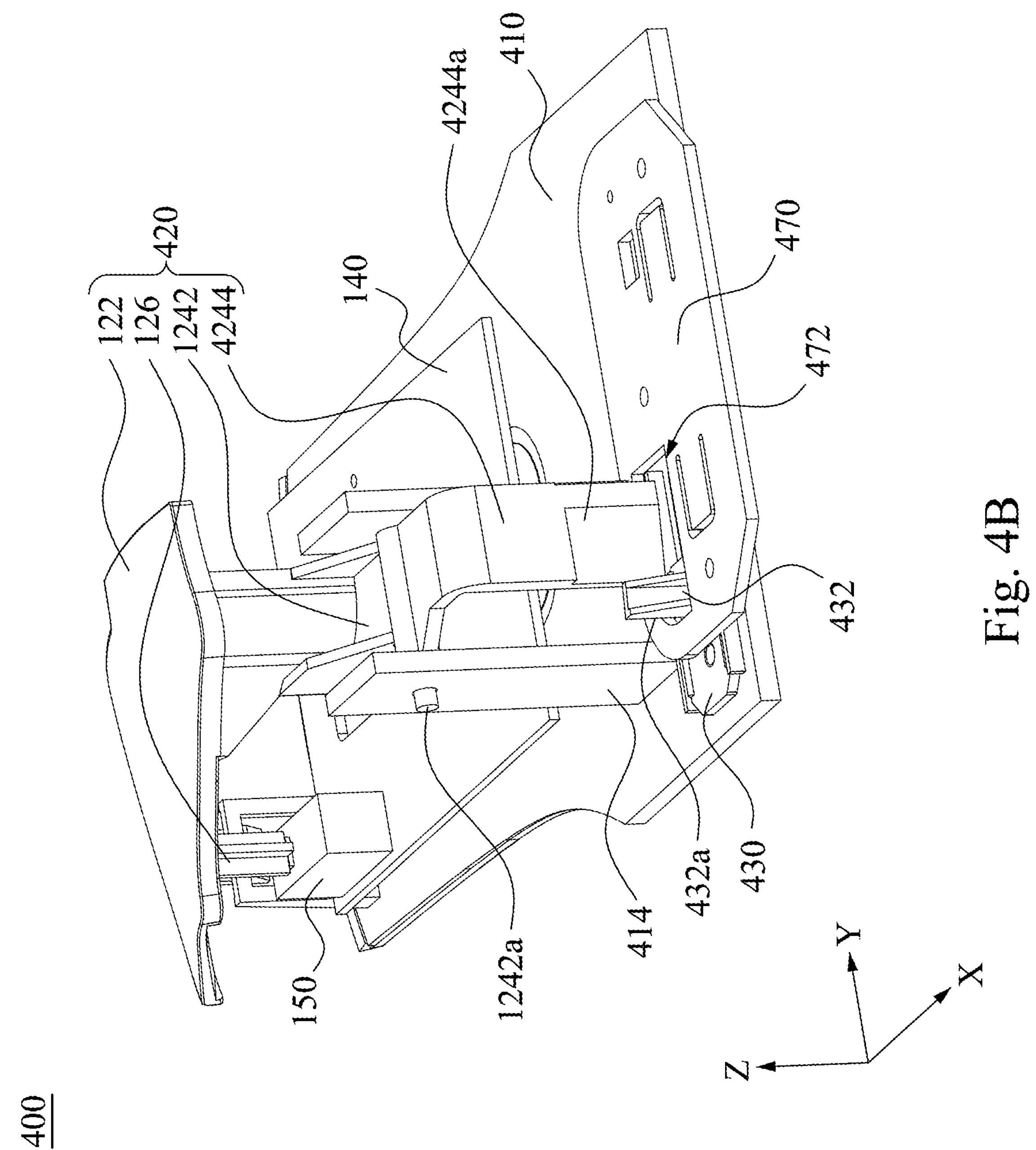
FIG. 4B is another perspective view of the mouse in FIG. 4A, wherein the slider is located at a second position.
Figure 4C:
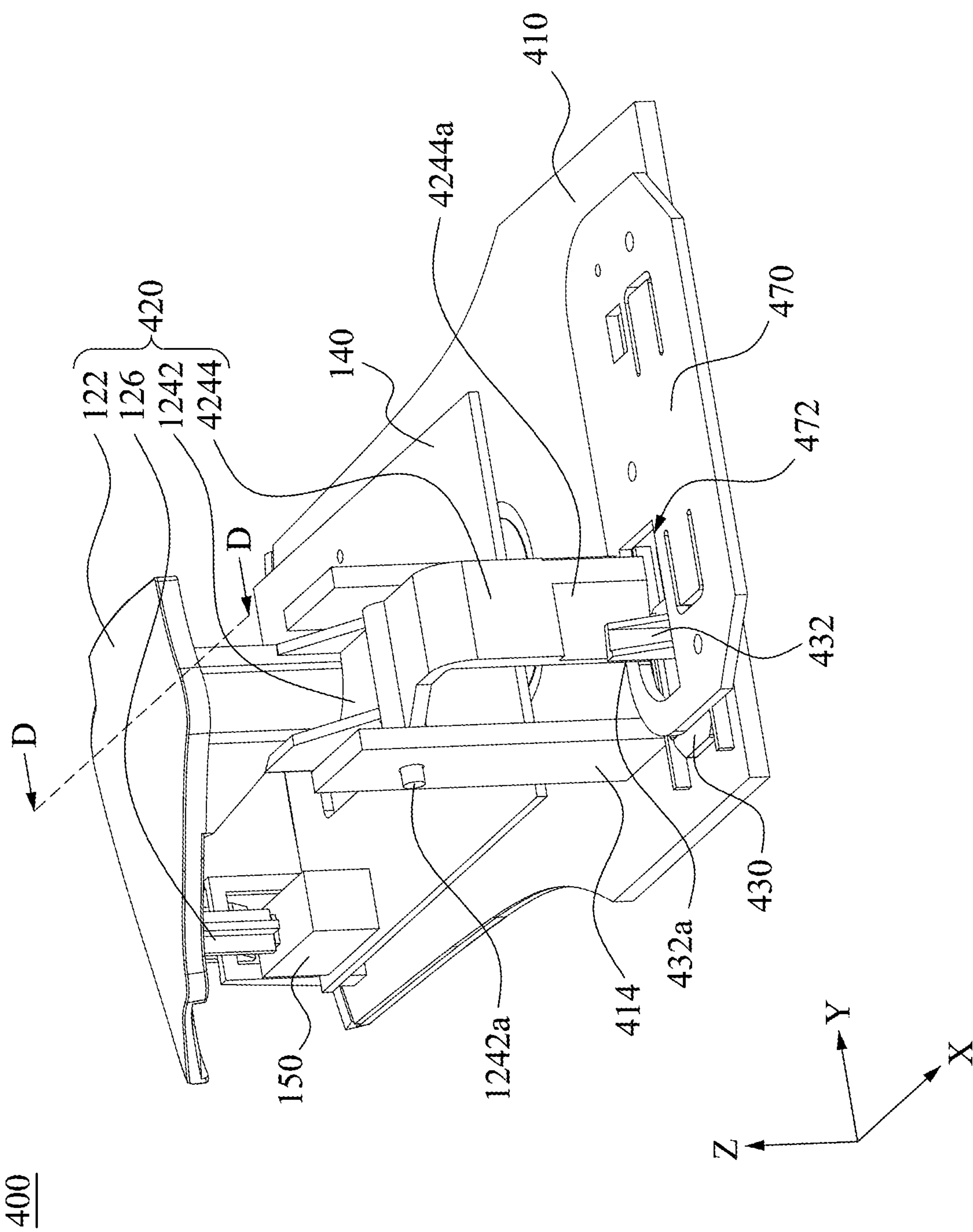
FIG. 4C is the other perspective view of the mouse in FIG. 4A, wherein the slider is located at a third position.

Reference is made to FIGS. 4B and 4C. FIG. 4B is another perspective view of the mouse 400 in FIG. 4A, wherein the slider 430 is located at a second position. FIG. 4C is the other perspective view of the mouse 400 in FIG. 4A, wherein the slider 430 is located at a third position. As shown in FIG. 4B, the slider 430 slides along the direction Y to the second position relative to the housing 410. When the slider 430 is located at the second position, the button 420 is not restricted by the second abutting portion 432 of the slider 430. Therefore, the user is able to click on the pressing portion 122 without applying much force. Furthermore, as shown in FIG. 4C, the slider 430 may also slide along the direction Y to the third position relative to the housing 410. In the embodiment, the third position is a position between the first position and the second position, but the disclosure should not be limited to the position shown in FIG. 4C. As the slider 430 slides from the first position to the third position, the first abutting surface 4244*a* is gradually separated from the second abutting surface 432*a*, such that the restriction exerted by the slider 430 to the rotation of the button 420 is gradually reduced. Furthermore, when the slider 430 is located at the third position, the restriction subjected by the button 420 is less compared to that when the slider 430 is located at the first position. However, when the slider 430 is located at the third position, the restriction subjected by the button 420 is more compared to that when the slider 430 is located at the second position. Therefore, the user may apply moderate force to click on the pressing portion 122.

Figure 4D:
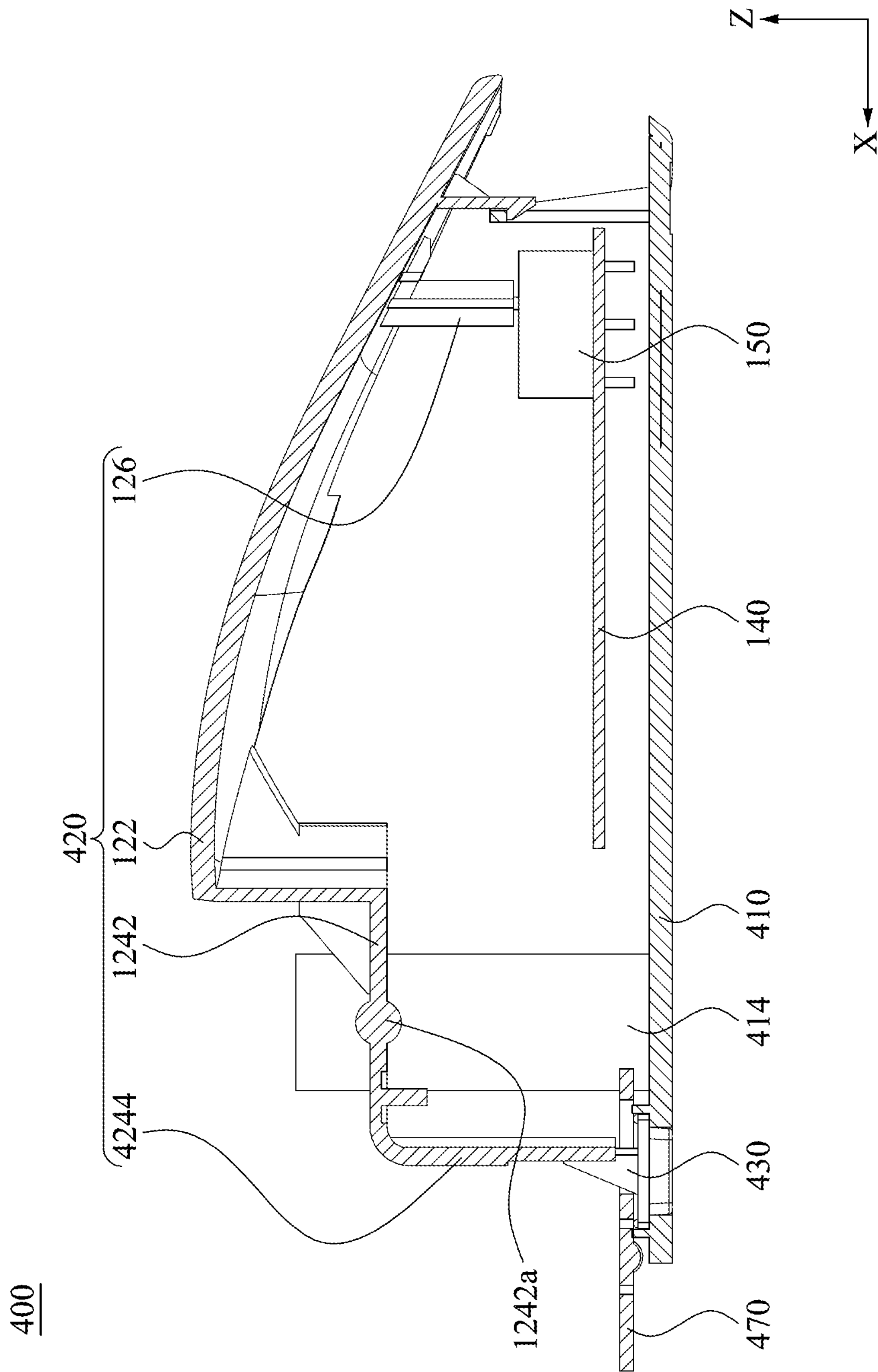
FIG. 4D is a cross-section view of the mouse taken along line D-D in FIG. 4C.

Reference is made to FIG. 4D. FIG. 4D is a cross-section view of the mouse 400 taken along line D-D in FIG. 4C. As shown in FIG. 4D, in the embodiment, the housing 410 includes two loading stages 414 (as shown in FIG. 4C). Compared with the embodiment of FIG. 2B, the loading stages 414 are disposed on two sides of the connecting portion 1242 respectively, and the loading stages 414 are pivotally engaged with the two ends of the rotating shafts 1242*a*. In other words, there is no loading stage 414 disposed under the connecting portion 1242 to support the connecting portion 1242. Therefore, in the embodiment, it is unnecessary to provide the elastomer 160 to be located between and to abut against the connecting portion 1242 and the loading stage 414.

With the embodiment in FIGS. 4A to 4D, the user can selectively adjust the position of the slider 430, such that the second abutting portion 432 of the slider 430 abuts against the first abutting portion 4244 of the button 420 at different positions. Thereby, the restriction effect of the slider 430 can be finely adjusted, so that the user can obtain different pressing feels when he/she clicks on the button 420.

In the above embodiment, the slider 430 can also slide along the direction X relative to the housing 410 as in the embodiment in FIGS. 2B and 2C, the disclosure should not be limited in this regard.

In some embodiments, the left button and the right button are respectively different structures. Specifically, the configuration of the first abutting portion of the left button and the slider corresponding to the left button are different from the configuration of the first abutting portion of the right button and the slider corresponding to the right button. For example, the first abutting portion of the left button is the first abutting surface. Correspondingly, the second abutting portion of the slider corresponding to the left button is the second abutting surface. On the other hand, the first abutting portion of the right button is a groove. Correspondingly, the second abutting portion of the slider corresponding to the right button is a hook, and the hook is engaged with the groove. In the embodiment, the slider corresponding to the left button slides along the direction Y to one of the first position, the second position, or the third position. The slider corresponding to the right button slides along the direction X to either the first position or the second position, but the disclosure should not be limited in this regard.

In some embodiments, the first position does not specifically refer to a position at which the slider abuts against the first abutting portion. The second position does not specifically refer to a position at which the slider is separated from the first abutting portion. The disclosure should not be limited in this regard.

From the above embodiments of the disclosure, it is apparent that, in the mouse of the present disclosure, the slider is provided to slide relative to the housing of the mouse to make the slider abut against or be separated from the button. As such, the limiting effect of the resilience of button is achieved. In this way, the user can adjust the resilience of the button according to user's own habit to achieve better pressing feel.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A mouse, comprising:
- a housing;
- a button pivotally connected to the housing and comprising a first abutting portion; and
- a slider slidably engaged with the housing and comprising a second abutting portion, wherein when the slider is located at a first position relative to the housing, the first abutting portion abuts against the second abutting portion, and when the slider is located at a second position relative to the housing, the first abutting portion is separated from the second abutting portion.

2. The mouse of claim 1, wherein the housing comprises a first opening and a second opening, and the button and the slider cover the first opening and the second opening respectively.

3. The mouse of claim 2, wherein the first opening and the second opening are disposed at opposite sides of the housing respectively.

4. The mouse of claim 2, wherein the button comprises:
- a pressing portion covering the first opening; and
- a lever portion connected to the pressing portion and comprising the first abutting portion.

5. The mouse of claim 4, wherein the lever portion and the pressing portion form a unitary structure.

6. The mouse of claim 1, further comprising a limiting member, wherein the limiting member has a through hole extending along a sliding direction of the slider, and the slider partially passes through the through hole.

7. The mouse of claim 1, wherein the slider is configured to slide along a sliding direction relative to the housing, the first abutting portion is a first abutting surface, the second abutting portion is a second abutting surface, the first abutting surface and the second abutting surface are inclined with respect to the sliding direction, and when the slider is located at the first position relative to the housing, the first abutting surface abuts against the second abutting surface.

8. The mouse of claim 7, wherein when the slider is located at a third position relative to the housing, the first abutting surface abuts against the second abutting surface, and the third position is a position between the first position and the second position.

9. The mouse of claim 1, wherein the first abutting portion comprises a groove, the second abutting portion is a hook, and when the slider is located at the first position relative to the housing, the hook is engaged with the groove of the first abutting portion.

10. The mouse of claim 1, wherein the second abutting portion is a sleeve, and when the slider is located at the first position relative to the housing, the slider is sleeved on an outer edge of the first abutting portion.

11. The mouse of claim 1, further comprising an elastomer, wherein the housing comprises a loading stage, and the elastomer is located between and abuts against the loading stage and the button.

* * * * *